July 27, 1926.

R. M. LOVEJOY 1,593,635

SHOCK ABSORBER

Filed Sept. 24, 1923

Inventor—
Ralph M. Lovejoy.
By—Heard Smith & Tennant.
Attorneys.

Patented July 27, 1926.

1,593,635

UNITED STATES PATENT OFFICE.

RALPH M. LOVEJOY, OF BOSTON, MASSACHUSETTS.

SHOCK ABSORBER.

Application filed September 24, 1923. Serial No. 664,387.

This invention relates to improvements in shock absorbers for cushioning the movement of two relatively movable members such as the movement between the axle of a vehicle and the frame and body of a vehicle which is supported by springs upon said axle and the principal object of the invention is to provide a shock absorber which will more effectively cushion not only heavy shocks caused by extended movements of the relatively movable members, but which will also cushion lighter shocks and will dissipate slight vibrations such as are occasioned by the passage of a vehicle over a slightly rough road or cobbled pavement.

A further object of the invention is to provide means for imposing a relatively high resistance to the movement of the relatively movable members at the initial and final portions of such relative movement, whereby a more gradual and quicker return to normal position will be accomplished.

A further object of the invention is to provide a plurality of readily replaceable spring-actuated relief valves whereby valves having springs of suitable resistance may be readily installed to correlate the requirements of the shock absorber to the conditions under which it is to be used, thereby enabling a shock absorber to be properly adapted to vehicles having bodies of different weight or springs of different capacities and other variable conditions.

Figure 1:
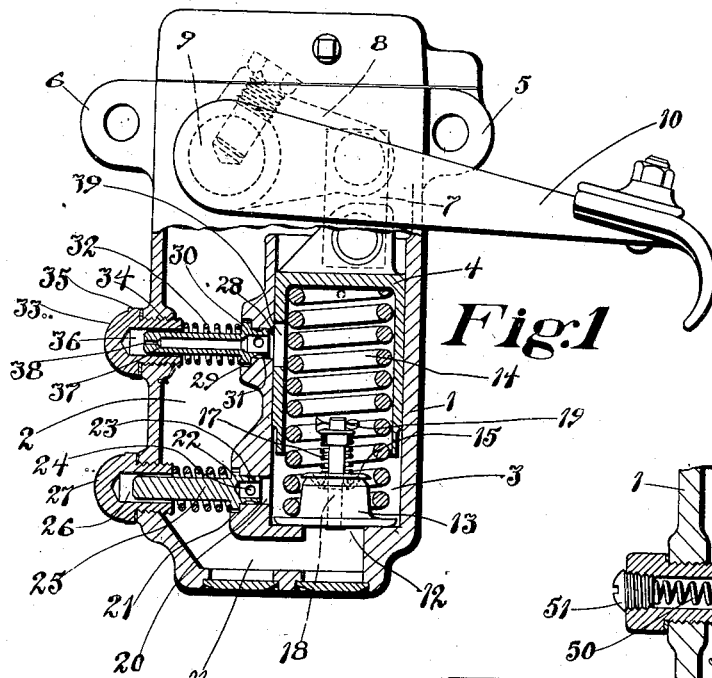
Figure 2:
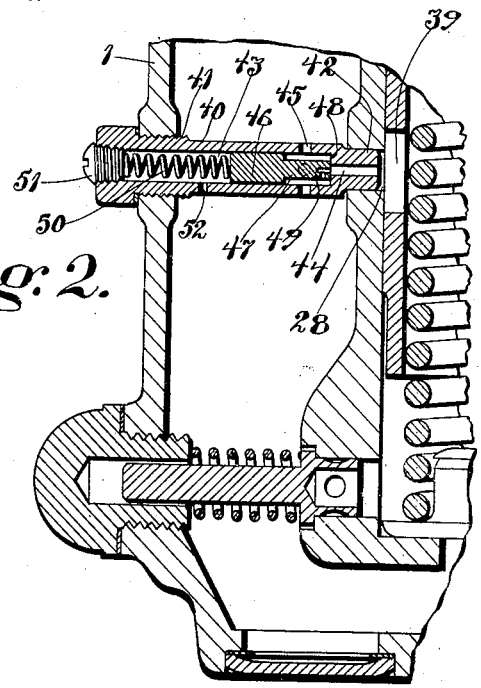
Figure 3:
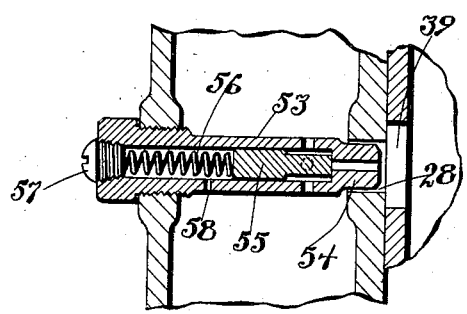

A preferred embodiment of the invention is illustrated in the accompanying drawings, in which, Fig. 1 is a view partly in side elevation and partly in vertical longitudinal section of a shock absorber embodying the invention;

Fig. 2 is an enlarged vertical sectional detail view of a modified form of the invention, and Fig. 3 is a detail view in vertical section of a portion of the shock absorber and another form of the relief valve embodying the invention.

The invention embodies certain improvements in shock absorbers disclosed in my prior Patent No. 1,324,913 granted December 16th, 1919 and more particularly is an improvement upon the invention disclosed in my prior application Serial No. 638,562, filed May 12th, 1923.

The shock absorber illustrated in the accompanying drawing may be, and preferably is, substantially the same in general form as that disclosed in my prior patent and application aforesaid and comprises a casing 1 presenting a reservoir 2 and a cylinder 3 having a preferably tubular piston 4 reciprocable therein and presenting a compression chamber at one side of the piston.

The casing 1 is provided with ears 5 and 6 adapted to be connected to one of two relatively movable members, such for example as the side bars of a frame of the vehicle and the piston 4 is connected by a link 7 to the internal arm 8 of a rock shaft 9 which is journalled in the upper portion of the casing and is provided with an outside arm 10 which is connected by a suitable flexible connection to the other relatively movable member as more fully disclosed in my prior patent aforesaid.

Means are provided for permitting the liquid which is contained in the reservoir 2 to flow freely into the cylinder 3 upon movement of the piston in one direction. In the construction shown a passage 11 leads from the reservoir to a port 12 in the lower end or head of the cylinder and this port is provided with a valve cage 13 which is held in place by a helical spring 14 which engages at its lower end a flange on the valve cage and at its upper end engages the under face of the tubular piston. The spring 14 acts both to retain the valve cage 13 upon its seat and tends to raise the piston and thereby to maintain a constant tension upon the flexible member which connects the arm 10 to one of the relatively movable members.

A light valve 15 is normally held seated upon the port of the valve cage by a helical spring 17 which surrounds a stem 18 fixedly secured in a suitable spider in the valve cage. The spring 17 rests at its lower end upon the valve 15 and at its upper end engages a collar upon said stem which is prevented from longitudinal movement thereupon by a cotter pin 19. The valve spring 17 is of light capacity and permits the liquid from the reservoir to flow freely into the cylinder upon upward movement of the piston but acts to seat the valve 15 immediately upon the arrest of such upward movement and to retain the valve 15 in seated position during the downward movement of the piston thereby preventing flow of the liquid from the cylinder into the reservoir through the port 12. Any other means may be provided for permitting a substantially free flow of liquid from the reservoir into the cylinder upon the intake movement of the piston.

The shock absorbing function of the shock absorber is produced by causing a suitable resistance to the flow of liquid from the cylinder to the reservoir upon the downward or compression movement of the piston. This has heretofore been accomplished by providing a single spring-actuated relief valve adapted to exert a resistance to the flow of fluid correlated to the amount of pressure imposed upon the liquid by the compression movement of the piston. In some constructions a small relief port has been provided either in the wall between the cylinder and reservoir or in the head of the piston. In the present invention a plurality of relief valves are provided, which preferably are spaced apart longitudinally of the wall which separates the cylinder from the reservoir and such valves are desirably provided with springs of different strength or capacity so that the valve which is controlled by the lighter spring will be more easily actuated in response to relatively slow movements of the piston while the valve or valves having progressively heavier springs will be actuated upon the longer strokes of the piston due to heavier shocks.

In order to cushion slight or vibratory movements of the piston such as are occasioned by the passage of an automobile over a slightly rough road or a cobbled pavement, means are provided to permit a restricted flow of fluid in either direction through the wall which separates the cylinder from the reservoir. In the construction illustrated in Fig. 1 a main relief port 20 is provided in the wall which separates the cylinder from the reservoir and the upper portion thereof is provided with a countersink 21 which forms the seat for a relief valve 22 and a tubular extension 23 which projects into the port 20 and is provided with one or more apertures 24 through which the liquid may flow from the cylinder into the reservoir when the valve has been forced sufficiently from its seat to cause the aperture 24 to communicate with the reservoir.

The valve 22 is provided with a stem 25 which projects into a recess or bore 26 in a plug 27 having an angular head to receive a wrench or other tool and provided with external screw threads engaging complementary screw threads in the wall of the reservoir or casing.

In the construction disclosed in Fig. 1 an auxiliary port 28 is located at a considerable distance above the port 20 and is provided with a countersink 29 which forms a seat for a valve 30 having a tubular extension 31 provided with an aperture similar to the aperture of the tubular extension 23 of the valve 22. The auxiliary valve 30 is normally held upon its seat by a helical spring 32 which abuts at one end against the valve and at its opposite end against the end of a plug 33 which is provided with external screw threads 34 and engages complementary screw threads in the wall of a suitable aperture in the outer wall of the casing. The plug 33 is provided with an angular head 35 and is also provided with a recess or bore 36 which forms a guideway for the stem 37 of the valve 30.

In the construction illustrated in Fig. 1 the valve stem 37 is hollow throughout the major portion of its length and is provided with a small duct 38 through which liquid may flow from the cylinder into the recess or bore 36 in the plug 34. The diameter of the valve stem 37 is somewhat less than the diameter of the recess 36 so that the liquid can flow from the recess 38 into the reservoir. This communication between the cylinder and reservoir is normally open and will permit a limited amount of liquid to flow from the cylinder to the reservoir or from the reservoir to the cylinder upon a slight movement or vibration of the piston.

Preferably the auxiliary port 28 is so located that the piston in its extended reciprocating movement will close the port thus transferring the entire control of the piston to the main relief valve which is under the influence of a relatively heavy spring. In the particular construction illustrated the tubular wall of the piston is provided with an aperture 39 which registers with the auxiliary port 28 when the piston is in normal position and the aperture 39 preferably is of greater longitudinal diameter than the port 28 so that the piston may have a considerable movement before closing the port. The auxiliary valve for the port 28 is provided with a lighter spring than that which controls the main relief valve. If more than one auxiliary valve is employed the respective valves located progressively near the piston head are desirably provided with springs of greater resistance. By reason of this construction relatively slow movements of the piston which are greater than the vibratory movements heretofore referred to will impose a sufficient pressure upon the auxiliary relief valve to force the same from its seat and thereby permit fluid to flow from the cylinder to the reservoir more freely than could be properly committed upon operation of the main relief valve. Thus the auxiliary valve acts to cushion the lighter shocks caused by the slower relative movement of the movable members.

By reason of this construction a greater resistance is offered to extended compression movement of the piston caused by heavy shocks for the reason that when the piston is raised sufficiently to close the port 28 its descent is controlled only by the main relief valve and a similar condition occurs when the piston is forced downwardly far enough to close the relief port 28 whereas during the intermediate portion of an extended movement of the piston the port 28 gradually comes into registry with the aperture 39 in the piston so that the liquid will exert its force upon the auxiliary valve, thus a maximum resistance is offered to the piston upon the initial and final movements of the piston which causes the relatively movable members more gradually and easily to return to normal position.

In Fig. 2 a modified form of relief valve is illustrated. In this construction the plug 40 which is provided with a screw-threaded portion 41 engaging the wall 1 of the casing extends across the reservoir and has a reduced end portion 42 which fits within the aperture 28 in the wall of the cylinder. The plug 40 is provided with a longitudinally extending bore or chamber 43 which extends approximately to the smaller end portion which enters the wall of the cylinder and the smaller end portion is provided with an aperture or port 44 of a relatively small diameter. One or more apertures 45 lead from the chamber 43 to the reservoir.

A cylindrical valve 46 slidably fits within the chamber 43 and is provided with a reduced end portion 47 which seats upon the end wall 48 of the chamber. The reduced end portion 47 of the valve is provided with a duct 49 which communicates with the port 44 in the valve and with the recess which surrounds the reduced end portion and with which recess the apertures or ports 45 in the plug communicate. The valve 46 is normally held seated by a relatively light spring 50 which abuts at one end against the valve 46 and at the other end against a screw 51 seated in the end of the plug. An aperture 52 is provided in the plug 40 beyond the valve 46 to permit any liquid which may leak by the valve to escape into the reservoir. Thus means are provided for permitting a restricted flow of liquid from the reservoir to the cylinder through the duct 49 and apertures or ports 45 upon relatively slight movements of the piston as aforesaid to dissipate shocks occasioned by vibratory movements of the piston while the valve will be unseated by a movement of the piston caused by the lighter shocks.

In Fig. 3 another form of relief valve is shown in which a plug 53 is seated in the wall of the casing as heretofore described and has a reduced end portion 54 which extends into the port 28 but is of slightly smaller diameter than the port 28 so that a restricted amount of liquid may flow from the cylinder to the reservoir and vice versa to dissipate shocks caused by vibratory movements of the piston.

In this construction the valve 55 is similar to the valve 46 but is not provided with any duct in its end as the necessity for a duct like that shown in Fig. 2 is obviated by reason of the space between the reduced end portion 54 of the plug and the wall of the auxiliary port 28. In this construction the valve 55 is normally held seated by a light spring 56 which abuts at one end against the valve and at the opposite end against a screw 57 in the end of the plug.

An aperture 58 is provided beyond the end of the valve 55 to permit liquid which leads by the valve to flow into the reservoir.

It will be understood that the present embodiment of the invention is of an illustrative character and is not restricted and that if desired other relief ports and valves may be provided and spaced at such distances along the cylinder wall as may be found desirable. It is also understood that various other forms of valves may be employed within the meaning and scope of the following claims.

Having thus described my invention, what I claim as new, and desire to secure by Letters Patent, is:

1. A hydraulic shock absorber comprising a reservoir for the liquid and a cylinder having a piston reciprocable therein and a head co-operating with said piston to provide a compression chamber at one side of the piston and means for permitting a free flow of the liquid from the reservoir into the compression chamber during the intake movement of the piston, said cylinder having a main port communicating with said compression chamber and reservoir and located beyond the position of maximum compression movement of the piston and an auxiliary port communicating with said compression chamber and reservoir located at such distance from the head of the cylinder as to be closed by the piston during its compression movement and spring actuated relief valves for controlling the discharge of liquid from said compression chamber through said ports upon the compression movement of the piston.

2. A hydraulic shock absorber comprising a reservoir for the liquid and a cylinder having a piston reciprocable therein and a head co-operating with said piston to provide a compression chamber at one side of the piston and means for permitting a free flow of the liquid from the reservoir into the compression chamber during the intake movement of the piston, said cylinder having a main port communicating with said compression chamber and reservoir and located beyond the position of maximum compression movement of the piston and an auxiliary port communicating with said compression chamber and reservoir located at such distance from the head of the cylinder as to be closed by the piston during its compression movement, spring actuated relief valves for controlling the discharge of liquid from said compression chamber through the respective ports upon the compression movement of the piston, one of said valves being provided with a spring of less resistance than the other and responsive to relatively short movements of the piston caused by light shocks.

3. A hydraulic shock absorber comprising a reservoir for the liquid and a cylinder having a piston reciprocable therein and a head co-operating with said piston to provide a compression chamber at one side of the piston and means for permitting a free flow of the liquid from the reservoir into the compression chamber during the intake movement of the piston, said cylinder having a main port communicating with said compression chamber and reservoir and located beyond the position of maximum compression movement of the piston and an auxiliary port communicating with said compression chamber and reservoir located at such distance from the head of the cylinder as to be closed by the piston during its compression movement, and spring actuated relief valves for controlling the discharge of liquid from said compression chamber through the respective ports upon compression movement of the piston, the valve for the auxiliary port being provided with a spring of less resistance than the other.

4. A hydraulic shock absorber comprising a reservoir for the liquid and a cylinder having a piston reciprocable therein and a head co-operating with said piston to provide a compression chamber at one side of the piston and means for permitting a free flow of the liquid from the reservoir into the compression chamber during the intake movement of the piston, said cylinder having a main port communicating with said compression chamber and reservoir and located beyond the position of maximum compression movement of the piston and an auxiliary port communicating with said compression chamber and reservoir located at such distance from the head of the cylinder as to be closed by the piston during its compression movement, and spring actuated relief valves for controlling the discharge of liquid from said compression chamber through the respective ports upon compression movement of the piston, the valve for the auxiliary port being provided with a spring of less resistance than the other and provided with a restricted tubular passage therethrough communicating with the reservoir whereby a restricted flow of the fluid from the compression chamber to the reservoir will be permitted upon slight or slow movements of the piston insufficient to unseat the auxiliary valve.

5. A hydraulic shock absorber comprising a reservoir, a cylinder having a piston reciprocable therein and provided with a compression chamber at one side of the piston, said cylinder having an inlet port and a main relief port located beyond the limit of the compression stroke of the piston and an auxiliary relief port within the field of movement of the piston, means for permitting a free flow of liquid from said reservoir through said inlet port during the intake stroke of the piston, yieldable means for restricting the flow of liquid through said main relief port upon compression movement of the piston and yieldable means for restricting the flow of liquid through said auxiliary relief port during a portion of the compression movement of the piston.

6. In a hydraulic shock absorber comprising a reservoir for the liquid and a cylinder having a piston reciprocable therein and a head co-operating with said piston to provide a compression chamber, means for permitting a free flow of the liquid from the reservoir into the cylinder during the intake movement of the piston, a main port and an auxiliary port located at different distances from the head of the cylinder, and spring-actuated relief valves for controlling the discharge of liquid from said cylinder through said ports upon the compression movement of the piston, and means for permitting a restricted flow of liquid through one of said ports uncontrolled by the valve for said port whereby vibratory movements of the piston causing insufficient pressure upon the liquid to actuate the valves will be cushioned.

7. In a hydraulic shock absorber comprising a reservoir for the liquid and a cylinder having a piston provided with a tubular wall reciprocable therein and means for permitting free flow of the liquid from the reservoir into the cylinder during the intake movement of the piston, a main port located beyond the limit of the compression stroke of the piston having a spring actuated relief valve to restrict the flow of liquid through said port, an auxiliary port having a spring actuated relief valve located within the field of movement of the tubular portion of the piston and an aperture in the tubular wall of the piston communicating with said auxiliary port when the piston is in normal position, but movable out of communication therewith upon extended compression movement of the piston, whereby increased resistance will be imposed by the liquid upon the piston during the initial and final portions of extended compression movements of the piston.

8. In a hydraulic shock absorber comprising a reservoir for the liquid and a cylinder having a piston provided with a tubular wall reciprocable therein and means for permitting free flow of the liquid from the reservoir into the cylinder during the intake movement of the piston, a main port located beyond the limit of the compression stroke of the piston having a spring-actuated relief valve to restrict the flow of liquid through said port, an auxiliary port having a spring-actuated relief valve located within the field of movement of the tubular portion of the piston and an aperture in the tubular wall of the piston communicating with said auxiliary port when the piston is in normal position but movable out of communication therewith upon extended movement of the piston in either direction, whereby increased resistance will be imposed by the liquid upon the piston during the initial and final portions of extended compression movements of the piston.

9. In a hydraulic shock absorber comprising a reservoir for the liquid and a cylinder having a piston provided with a tubular wall reciprocable therein and means for permitting free flow of the liquid from the reservoir into the cylinder during the intake movement of the piston, a main port located beyond the limit of the compression stroke of the piston having a spring-actuated relief valve to restrict the flow of liquid through said port, an auxiliary port having a spring-actuated relief valve located within the field of movement of the tubular portion of the piston and an aperture in the tubular wall of the piston of greater longitudinal diameter than said auxiliary port communicating with said auxiliary port when the piston is in normal position but movable out of communication therewith upon extended movement of the piston in either direction, whereby increased resistance will be imposed by the liquid upon the piston during the initial and final portions of extended compression movements of the piston.

In testimony whereof, I have signed my name to this specification.

RALPH M. LOVEJOY.